Dec. 4, 1945.   C. J. FINK   2,390,087
SHEATHING UNIT
Filed May 10, 1944
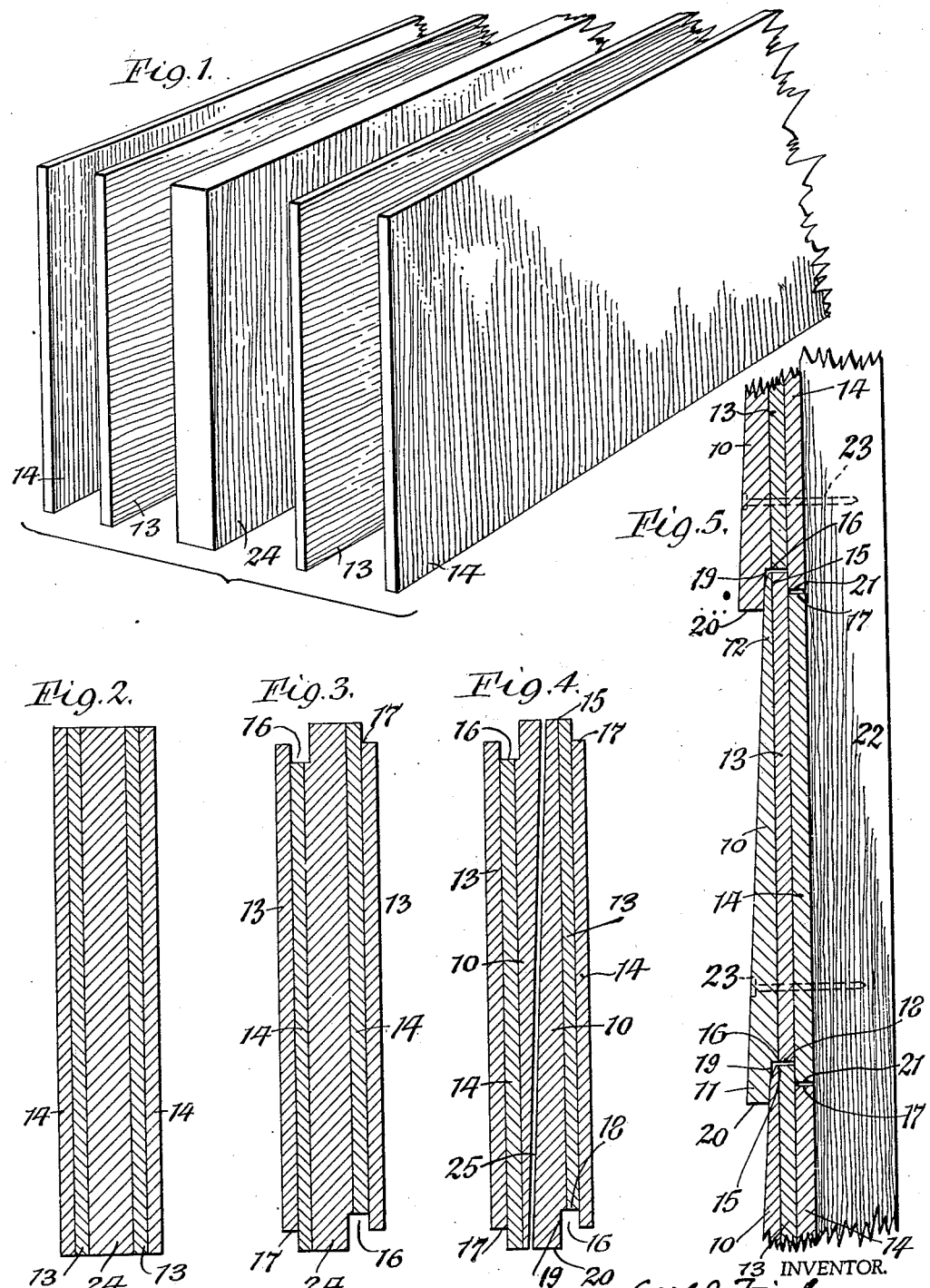

Patented Dec. 4, 1945

2,390,087

UNITED STATES PATENT OFFICE 2,390,087

SHEATHING UNIT

Carl J. Fink, Buffalo, N. Y., assignor to Creo-Dipt Company, Inc., North Tonawanda, N. Y., a corporation of New York Application May 10, 1944, Serial No. 534,900

1 Claim. (Cl. 20—5)

This invention relates to a sheathing unit for building structures and more particularly to a sheathing of this character having the form of a panel having shingles which face the weather.

One of the objects of this invention is the production of such sheathing which is very strong and durable and affords maximum protection against the weather and which can be erected easily, quickly and readily at comparatively low cost.

A further object of this invention is to provide a method whereby this sheathing can be manufactured expeditiously and economically and with practically no waste of materials.

In the accompanying drawing:

Fig. 1 is a perspective view showing the several elements which enter into the manufacture of this improved product and arranged in a position preparatory to assembling, connecting and treating the same in accordance with this invention.

Figs. 2, 3 and 4 represent cross sections showing the several stages of the method used in the manufacture of the sheathing embodying the instant improvements.

Fig. 5 is a vertical section showing the manner in which a plurality of panels containing this invention are assembled and mounted on the studding of a building to produce a siding thereon.

In the following description the same reference characters indicate like parts in the several figures of the drawing.

In its preferred form each sheathing panel or unit, as shown in Fig. 5, is constructed as follows:

The numeral 10 represents the weather or facing member of the sheathing unit or panel which is preferably constructed of a board or sheet of cedar in which the grain runs crosswise and which is tapered crosswise in the form of a shingle or clapboard so that the lower longitudinal edge portion 11 of the same is thick, and the upper longitudinal edge portion 12 thereof is comparatively thin. This weather facing therefore is similar to that of ordinary shingles in which the grain runs lengthwise thereon from the thin to the thick ends of the body of the shingle. The front side of this facing is exposed to the weather and on its rear side it is secured to a reinforcing member or backing for the purpose of strengthening the facing. This backing member is preferably constructed of a plurality of plies or layers of plywood, such as pine, two of such layers 13, 14 being shown in the drawing as an example of a plywood backing suitable for this purpose.

For the purpose of deriving the greatest amount of reinforcement or strength from the backing member or board of plywood, the grain of the wood in the front ply 13 runs lengthwise of this ply and the grain of the rear ply 14 runs crosswise of the same, in other words, the grain of wood in the facing ply or board and the rear layer 14 of the plywood backing run at right angles to the grain in the front or intermediate ply or layer 13, or at least at a pronounced angle relative to one another so as to stiffen the panel as a whole, in the usual manner of constructing plywood.

These several plies or layers of facing wood and backing wood may be connected by any suitable means so that the same form an integral panel or unit, this being preferably accomplished by applying any well-known adhesive agent, such as glue, cement or the like to the cooperating surfaces of these layers and subjecting these members to pressure while the adhesive is drying.

Each of these sheathing units is provided at its thin upper edge with a longitudinal tenon or tongue 15 and at its thick lower edge with a groove or channel 16 which is adapted to receive the tenon of another panel. The tenon is formed by the upper thin edge portion of the facing and the corresponding edge portion of the front layer 13 of the plywood backing projecting beyond the upper edge 17 of the rear layer 14 of the plywood backing and forming a rabbet on the respective longitudinal inner corner of the unit, as shown in Fig. 5.

The groove or channel in the lower edge of the sheathing unit or panel is formed between the lower parts of the facing sheet or board and the front and rear layers of the plywood backing by terminating the lower edge 18 of the front plywood layer 13 short of the lower edges of the facing sheet 10 and the rear plywood layer 14 and also by rabbeting the lower rear corner of the facing board or member 10, as shown at 19 in Fig. 5, thereby making this groove sufficiently wide to accommodate the width of the tenon on another panel or sheathing unit. The lower edge 20 of the facing 10 is extended downwardly somewhat farther than the lower edge 21 of the rear layer 14 of the backing for the purpose of causing the lower thick part of the facing of each sheathing unit to overlap the upper thin part of another sheathing unit to a greater extent and thus exclude weather more effectively from the longitudinal joint between adjacent sheathing panels or units.

When erecting a siding or wall of a building embodying this invention a plurality of the units or panels of the character described are assembled successively one above the other on a support such as studding 22 so that the tenon in each lower panel engages with the groove in the next upper panel and the several panels are secured to the studding by mounting nails 23, as shown in Fig. 5, or other suitable fastening, and when thus erected a building structure is produced which possesses the maximum strength and is not only very durable but also forms an effective protection against the weather.

Although the sheathing panels or units embodying this invention may be produced by various methods it is preferable to make the same in accordance with the present invention which is as follows:

A body or shingle board 24 which is of the desired kind of wood and is oblong and rectangular in cross section is first dressed to the required length, width and thickness. Backing members are then applied to the opposite flat sides of the body board, each of which preferably comprises two layers of pine plywood, a front or inner layer 13 which is arranged next to each side of the body board and an outer layer 14 which is arranged on the outer side of each of said inner layers 13. The grain of the wood of the body board 24 and the outer layers 14 of the plywood backings run crosswise of these members and the grain of the wood of the inner layers 13 of the plywood backings run lengthwise of these members, as shown in the disassembled positions of these members in Fig. 1, so as to reinforce this structure as a whole. The several wooden layers are firmly united with each other by applying glue or the like to their opposing contacting sides and subjecting the same to pressure and drying until the adhesive agent has properly set. As a result of the foregoing steps a blank is produced which in cross section has the appearance shown in Fig. 2.

Each of the longitudinal edges of this blank is now cut by means of a suitable matching or routing tool to remove the longitudinal edge portions of one of the outer layers 14 of the blank as a step toward forming a tenon 15 on the adjacent part of the blank and also form grooves 16 in the corresponding longitudinal edges of the body board and the inner and outer backing layers 13, 14 on the other side of the blank, as shown in Fig. 3.

The body board is now divided by a cut or kerf 25 extending lengthwise of this board and inclining diagonally across the same from one longitudinal edge of the body board to the other and thus convert the latter into two facing or weather members 10, each of which is thick at one of its longitudinal edges and contains part of the groove in the respective edge of the panel or unit, while the other longitudinal edge is thin and forms part of the tenon on the respective edge of a panel or unit.

It will now be apparent from the foregoing description that the method of making sheathing units in accordance with this invention includes assembling the several members of a blank by placing laminated backings on opposite sides of a central body board, forming a longitudinal rabbet at one longitudinal corner of each edge of the blank and a longitudinal groove adjacent to the other longitudinal corner of the same edge of the blank, the rabbets being arranged on two diagonally opposite corners of the body board and the grooves being arranged adjacent to the other two diagonally opposite corners of the blank, and then severing said body board diagonally from one edge to the other so as to form two sheathing units, each of which is comparatively thick at one of its edges and comparatively thin at its opposite edge.

This method of manufacturing these sheathing units or panels is very simple and enables these goods to be produced readily and economically with a minimum amount of material.

For the purpose of manufacturing these sheathing units economically a comparatively large laminated slab is made from a plurality of sheets of the desired kind of wood which are cut from logs in the usual manner of producing veneer for plywood, which sheets are glued together and then cut into planks similar to that shown in Fig. 2. The faces or weather sides of the outer layers 14 of these planks may also be left plain and present the appearance of sawed shingles or the same may be scored in imitation of rived or split shingles usually known as shakes.

I claim as my invention:

The hereindescribed method of making sheathing units which comprises assembling a blank to form a central body board and two backing boards on opposite sides of the body board and each backing board containing a plurality of plies in which the grains in adjacent plies run at an angle to one another, forming longitudinal rabbets on two of the diagonally opposite longitudinal corners on the opposite edges of the blank and two longitudinal grooves on opposite edges of the blank adjacent to the other two diagonally opposite corners thereof, and cutting said body board diagonally so as to divide the same into two body sections each of which is thick at one end and contains one of said grooves and thin at its opposite edge and forms a tenon thereon adjacent to the respective rabbet.

CARL J. FINK.